US011567718B2

(12) United States Patent
Tomita

(10) Patent No.: US 11,567,718 B2
(45) Date of Patent: Jan. 31, 2023

(54) DISTRIBUTION PROCESSOR, IMAGE FORMING APPARATUS, AND DISTRIBUTION PROCESSING METHOD

(71) Applicant: SHARP KABUSHIKI KAISHA, Sakai (JP)

(72) Inventor: Chikako Tomita, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/400,858

(22) Filed: Aug. 12, 2021

(65) Prior Publication Data
US 2022/0057976 A1  Feb. 24, 2022

(30) Foreign Application Priority Data

Aug. 24, 2020 (JP) .............................. JP2020-140701

(51) Int. Cl.
*G06F 3/12* (2006.01)
(52) U.S. Cl.
CPC .......... *G06F 3/1267* (2013.01); *G06F 3/1204* (2013.01); *G06F 3/1232* (2013.01); *G06F 3/1243* (2013.01); *G06F 3/1265* (2013.01)
(58) Field of Classification Search
None
See application file for complete search history.

(56) References Cited

U.S. PATENT DOCUMENTS

| 2009/0141930 A1* | 6/2009 | Kiwada | H04N 1/32203 382/100 |
| 2017/0212714 A1* | 7/2017 | Watanabe | G06F 3/1229 |
| 2021/0195039 A1* | 6/2021 | Tomita | G06F 3/1236 |

FOREIGN PATENT DOCUMENTS

| JP | 2008-141256 A | 6/2008 |
| JP | 2011-103068 A | 5/2011 |

* cited by examiner

*Primary Examiner* — Frantz Bataille
(74) *Attorney, Agent, or Firm* — ScienBiziP, P.C.

(57) ABSTRACT

A distribution processor performs processing related to distribution of materials. The distribution processor includes a storage storing material data and material distribution information including a sending address and printing necessity of the material data for each of distribution members, a counter counting based on the material distribution information or the material data, a data sending processor sending the material data to the sending address of each of the distribution members for the material data based on the material distribution information and a counting result of the counter, and a printing information generating section generating printing information for printing the material data. The counter counts the number of copies to be printed of the material data distributed according to the printing necessity. The printing information generating section generates the printing information including the distribution members and the number of copies to be printed counted by the counter.

7 Claims, 10 Drawing Sheets

FIG. 5

| MEMBER | DEPARTMENT | EMAIL ADDRESS | DATA SENDING ADDRESS | PRINTING NECESSITY |
|---|---|---|---|---|
| A | DEPARTMENT W | aaa@xxx.co.jp | aaa@xxx.co.jp | Yes |
| B | DEPARTMENT W | bbb@xxx.co.jp | bbb@xxx.co.jp | No |
| C | DEPARTMENT W | ccc@xxx.co.jp | /pcxxx/c/doc/mtg | No |
| D | DEPARTMENT Y | ddd@xxx.co.jp | ddd@xxx.co.jp | Yes |
| E | DEPARTMENT Y | eee@xxx.co.jp | eee@xxx.co.jp | No |
| F | DEPARTMENT Y | fff@xxx.co.jp | fff@xxx.co.jp | No |
| G | DEPARTMENT Z | ggg@xxx.co.jp | | Yes |
| H | DEPARTMENT Z | hhh@xxx.co.jp | hhh@xxx.co.jp | No |
| I | DEPARTMENT Z | iii@xxx.co.jp | iii@xxx.co.jp | Yes |

121

DISTRIBUTION PROCESSOR, IMAGE FORMING APPARATUS, AND DISTRIBUTION PROCESSING METHOD

BACKGROUND OF THE INVENTION

Field of the Invention

The present invention relates to a distribution processor and the like that performs distribution processing of meeting materials and the like, especially printed materials.

Description of the Background Art

In recent years, an increasing number of people are using electronic data, instead of paper form, to view and use meeting materials and specifications on personal computers (PCs), tablets, and the like. Accordingly, in distribution materials, it becomes no longer necessary to print out copies of materials for all members, but some members still need printed materials.

In a case where a multifunction peripheral (MFP) is used to print materials for distribution to a certain department or a group, a certain degree of distinction usually exists between those who usually view materials in electronic data and those who require paper media, so that it is necessary to set up groups and register members of the groups in advance to specify whether each member wants to receive paper data, electronic data, or both. In printing, it is possible to print the number of copies of paper data for the number of people who need the paper data, while for those who want to receive electronic data, the electronic data can be sent to previously specified addresses.

Japanese Unexamined Patent Application Publication No. 2008-141256 discloses an image forming apparatus capable of multi-transmission of scanned image data by multiple methods (e.g., by email and fax), and also capable of giving printing instructions. A user need to set the multi-transmission and the printing instruction every time.

When a user wants to print and distribute paper data to a plurality of people, the user typically sets the number of copies to be printed and print the data by oneself. When the user wants to send the same data as electronic data, the user has to additionally set a group or addresses by oneself to scan and send the data. Thus, when a single material is to be distributed to all members of a group, the person who distributes the material needs to count the number of copies to be printed and specify the delivery addresses, and the operation on the MFP is complicated.

In view of the above situation, it is an object of the present invention to provide a distribution processor and the like that can eliminate the need for checking printing necessity and setting the number of copies to be printed for each of members to whom materials are sent (hereinafter occasionally referred to as "distribution member(s)"), thus improving operational efficiency.

SUMMARY OF THE INVENTION

The present disclosure provides a distribution processor that performs processing related to distribution of materials, including a storage that stores material data and material distribution information including a sending address and printing necessity of the material data for each of a plurality of distribution members, a counter that performs counting in accordance with the material distribution information or the material data, a data sending processor that sends the material data to the sending address of each of the distribution members for the material data in accordance with the material distribution information and a counting result of the counter, and a printing information generating section that generates printing information for printing the material data, in which the counter counts the number of copies to be printed of the material data that is distributed depending on the printing necessity of the material distribution information, and the printing information generating section generates the printing information including the distribution members and the number of copies to be printed counted by the counter.

The present disclosure also provides an image forming apparatus including the distribution processor and, along with sending data, performs printing processing of the material data in accordance with the printing information.

The present disclosure also provides a distribution processing method that performs processing related to material distribution, including storing material data and material distribution information including a sending address and printing necessity of the material data for each of a plurality of distribution members, counting in accordance with the material distribution information or the material data, sending the material data to the sending address of each of the distribution members for the material data in accordance with the material distribution information and a counting result in the counting, and generating printing information for printing the material data, in which the counting counts the number of copies to be printed of the material data that is distributed depending on the printing necessity of the material distribution information, and the generating the printing information generates the printing information including the distribution members and the number of copies to be printed counted in the counting.

The present invention eliminates the need to survey the members who need printing and set the number of copies to be printed each time the materials are distributed for a meeting or the like. Since the number of members who need printing and the number of copies to be printed can be determined simply by specifying the members who need printing, no omission occurs in the number of copies to be printed, thus improving operational efficiency.

BRIEF DESCRIPTION OF THE DRAWINGS

FIG. 5 is an explanatory view showing an example of material distribution information;

DESCRIPTION OF THE PREFERRED EMBODIMENTS

Embodiments of the present disclosure will be described below with reference to the accompanying drawings.

First Embodiment

Figure 1:
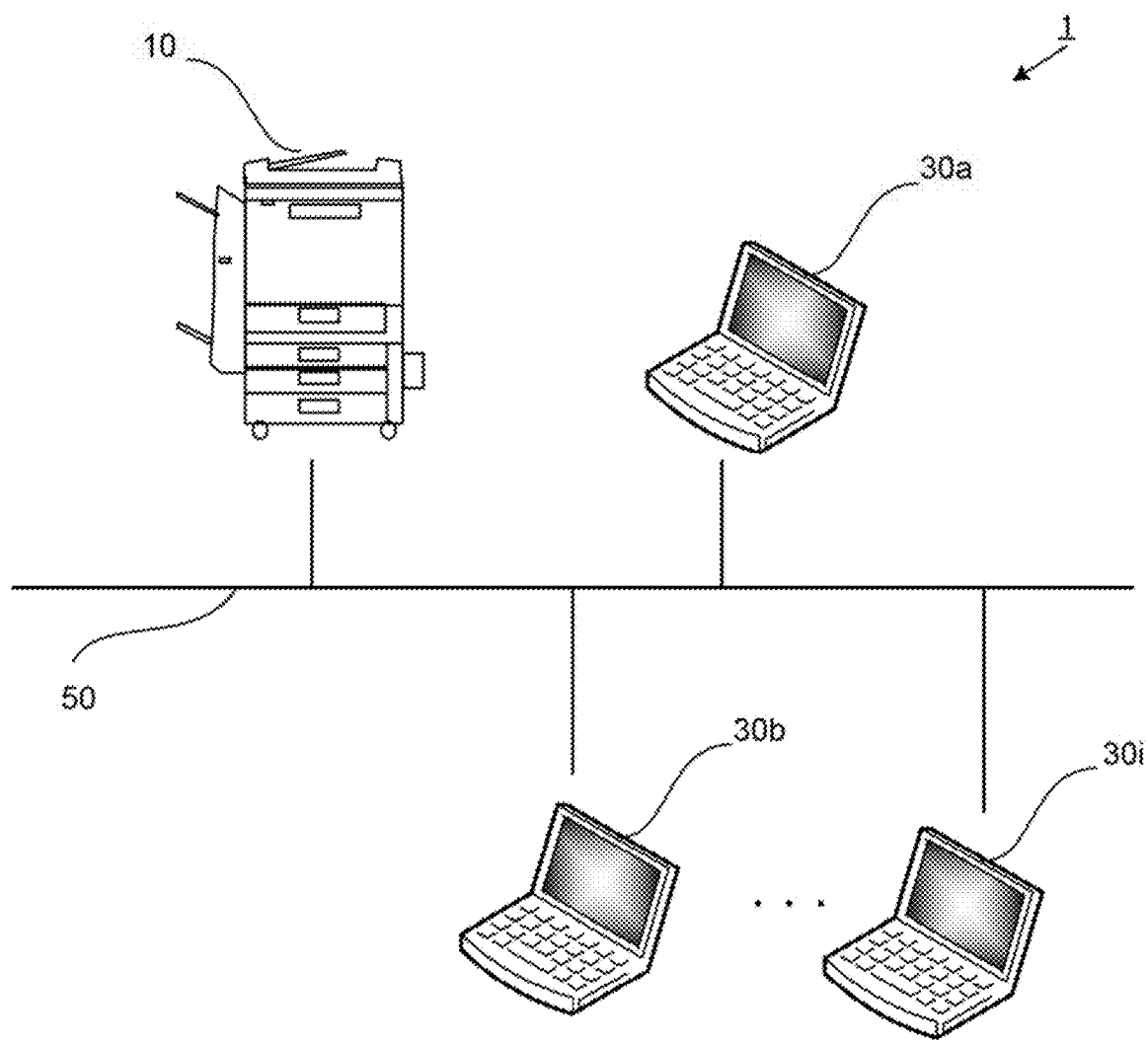
FIG. 1 illustrates a configuration of a distribution processing system according to a first embodiment.

FIG. 1 illustrates a configuration of a distribution processing system according to a first embodiment. A distribution processing system 1 includes an image forming apparatus 10 and terminal devices 30 (30a to 30i), and these apparatus and devices are connected by a network 50. The terminal devices 30a to 30i are assumed to be terminal devices used by users A to I, respectively.

In the distribution processing system 1 according to the first embodiment, material distribution information related to distribution of materials is stored for individual members of a meeting, and the distribution is performed in accordance with the material distribution information by simply specifying the members in the material distribution information. Since the material distribution information is automatically updated, the user do not need to update the material distribution information. Alternatively, the update may be executed by the user by updating the registration.

Figure 2:
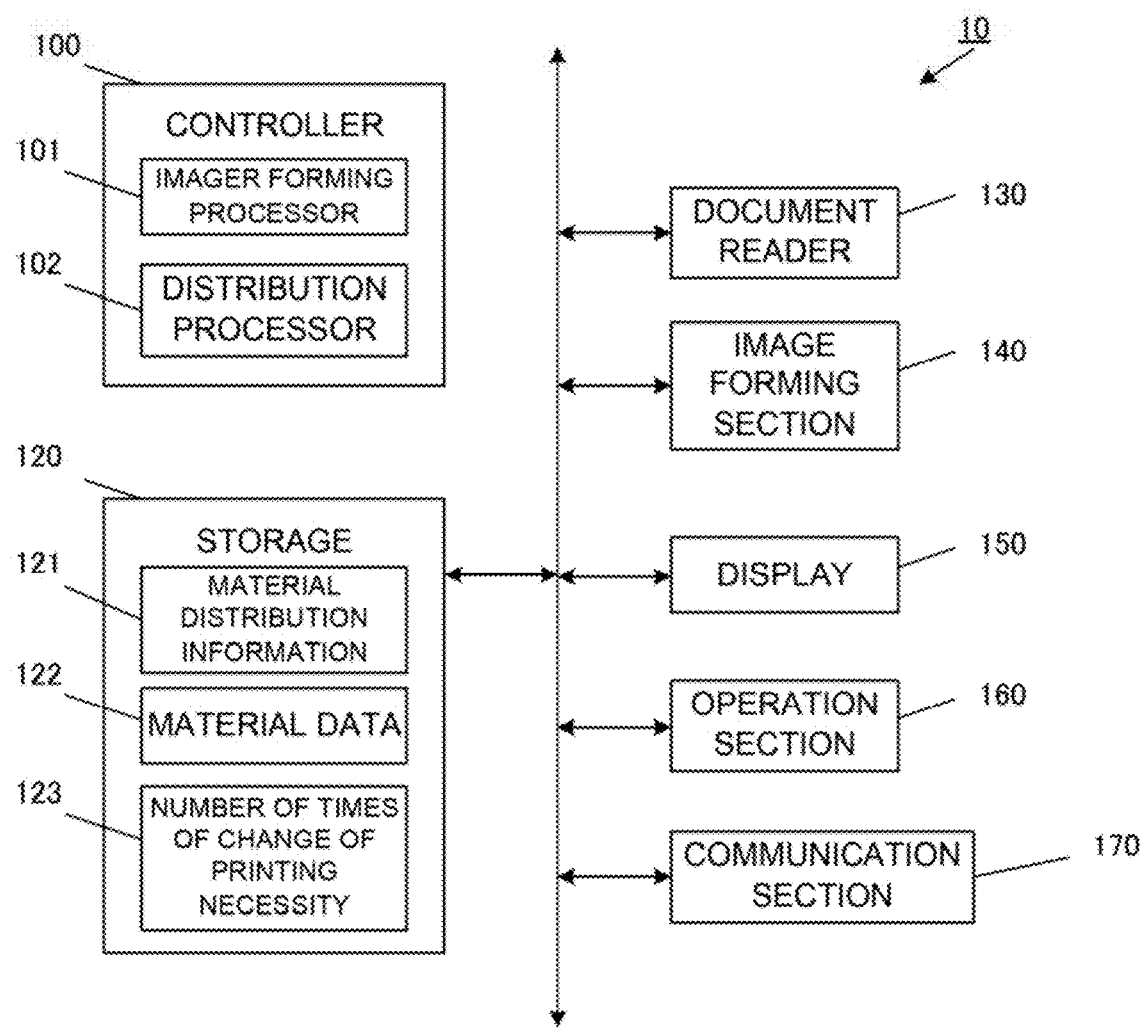
FIG. 2 is a block diagram of an image forming apparatus according to the first embodiment.

Next, the configuration of each device is described.
Functional Configuration of Each Device
1. Image Forming Apparatus The image forming apparatus 10 illustrated in FIG. 2 is an MFP installed in convenience stores and the like and has multiple modes. The image forming apparatus 10 of the present embodiment has modes described below.

The modes of the image forming apparatus 10 are those that can achieve commonly-used copying, faxing, and scanning functions. When the image forming apparatus 10 is in the copy mode, a copy job can be executed; when in the fax mode, a fax job can be executed; and when in the scanner mode, a scanner job can be executed.

A controller 100 is a functional unit that controls the entire image forming apparatus 10. The controller 100 implements various functions by reading and executing a control program stored in a storage 120, and includes one or more arithmetic devices (e.g., a central processing unit (CPU) or the like).

Figure 3:
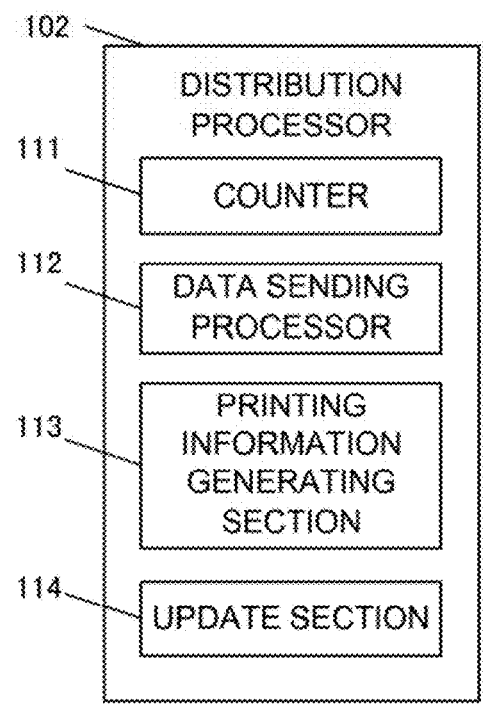
FIG. 3 is a block diagram of a distribution processing section of the image forming apparatus according to the first embodiment.

The controller 100 includes an image forming processor 101 that performs processing related to image forming and a distribution processing section 102 that performs processing related to distribution of materials. As illustrated in FIG. 3, the distribution processing section 102 includes a counter 111, a data sending processor 112, a printing information generating section 113, and an update section 114.

The counter 111 performs counting of material distribution information, which will be described later, and material data. For example, when distribution members are specified, the number of copies to be printed is counted in accordance with the material distribution information. The counter 111 also counts the number of pages of materials and the number of distribution members.

The data sending processor 112 sends the material data to a designated destination specified by a mailing address via a communication section 170. The printing information generating section 113 generates information necessary for printing (data to be printed and the number of copies to be printed) and outputs the information to the image forming processor 101.

The update section 114 causes the counter 111 to perform counting by changing the printing necessity and leaving the other contents of the material distribution information stored in the storage 120 unchanged when, for example, there is a change of instruction from the terminal device 30 regarding the printing necessity. In addition, the storage 120 stores the number of times of change. The update section 114 updates the printing necessity of the material distribution information to the changed contents when the change of the printing necessity occurs a predetermined number of times or more.

The storage 120 is a functional unit in which programs and data are stored. The storage 120 is constituted of, for example, a semiconductor storage device such as a solid state drive (SSD), or a hard disk drive (HDD).

In addition to the program for processing, the storage 120 stores material distribution information 121, material data 122, and the number of times of change of printing necessity 123, as illustrated in FIG. 2. The number of times of change of the printing necessity 123 may be included in the material distribution information 121.

A document reader 130 reads an image of a document and generates image data, and includes a scanner or the like equipped with a device such as a contact image sensor (CIS) or a charge coupled device (CCD) that converts optical information into electrical signals.

For example, the document reader 130 reads the document placed on a loading table within a range set according to the size of the document and outputs image data of the document. The document may be set on the loading table or an automatic document feeder (ADF).

An image forming section 140 is a functional unit that forms image data on a recording medium (e.g., recording paper). For example, the recording paper is fed from a paper tray and is ejected from an ejection tray after the image is formed on the surface of the recording paper in the image forming section 140. The image forming section 140 is constituted of, for example, a laser printer or the like that uses electrophotography.

A display 150 displays various states of the image forming apparatus 10 and the operation input. The display 150 is constituted of, for example, a liquid crystal display (LCD) or an organic electro-luminescence (EL) panel.

An operation section 160 is a button, switch, or the like that receives operation input from the user. The operation section 160 may be implemented by a hardware input device such as a switch or a keyboard, or by a touch panel or the like formed integrally with the display 150. A touch panel input can be detected by any common detection method using, for example, a resistive film, infrared light, electromagnetic induction, or electrostatic capacity.

A communication section 170 communicates with other devices via a network. For example, the network communication section 170 should have an interface that can connect to a network and can communicate with other devices via a wired/wireless local area network (LAN). The communication section 170 also supports Bluetooth (registered trademark) to communicate with other Bluetooth-enabled devices.

The communication section 170 is also a functional unit for performing fax communication. For example, image data (text data) can be sent and received as a document to and from other fax machines, MFPs, computers, and the like via the Information Network System (ISN) lines. Other communications including circuit-switched communication using analog telephone lines or the Internet Services Digital Network (ISDN) lines, packet communication, and communications using the Internet (e.g., Internet FAX) may be used. In other words, any communication method can be used to allow the received documents to be stored and processed as the image data.

FIG. 5 is an explanatory view showing material distribution information. The material distribution information 121 is a list of members, departments, email addresses, data sending addresses, and printing necessity. In FIG. 5, the members include A to I, and the departments to which the members belong are departments W, Y, and Z. The email addresses are email contact information of the members. The data sending addresses are mostly the email addresses, but different addresses may be specified as in member C. The data sending address may not be registered, as in member G, in which case the data distribution is not performed. In the printing necessity column, "Yes" indicates that printing is necessary and "No" indicates that printing is not necessary.

The material data 122 is sent to the image forming apparatus 10 from the terminal device 30a used by a distributor (member A).

2. Terminal Device

Figure 4:
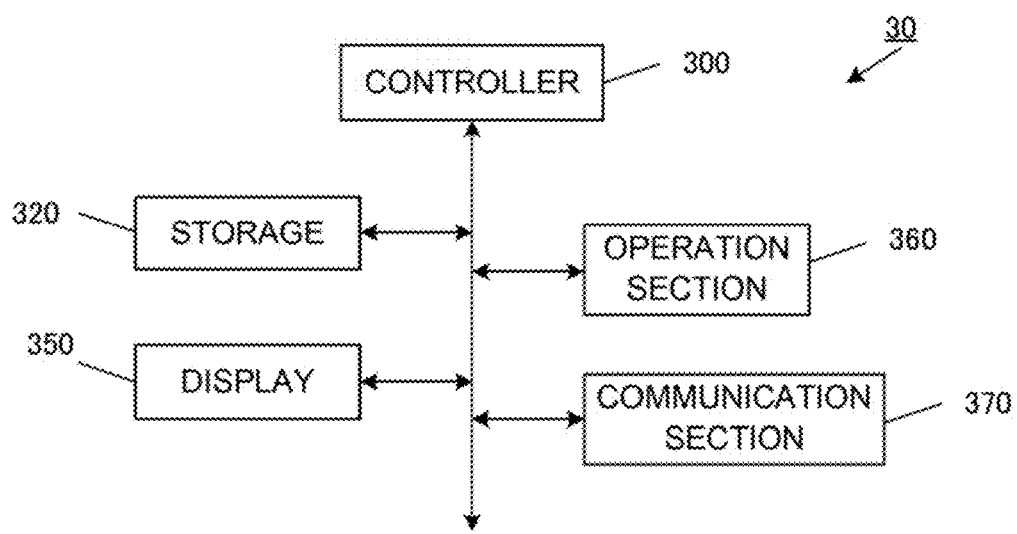
FIG. 4 is a block diagram of a terminal device according to the first embodiment.

The terminal device 30 illustrated in FIG. 4 is, for example, a PC, a notebook PC, a tablet, or the like, and includes a controller 300, a storage 320, a display 350, an operation section 360, and a communication section 370.

The controller 300 is a functional unit that controls the entire terminal device 30. The controller 300 implements various functions by reading and executing a control program stored in the storage 320, and includes one or more arithmetic devices (e.g., a CPU or the like).

The storage 320 is a functional unit in which programs and data are stored. The storage 320 includes, for example, a semiconductor storage device such as an SSD, or an HDD.

The display 350 displays various states of the terminal device 30 and the operation input. For example, the display 350 is constituted of, for example, an LCD or an organic EL panel.

The operation section 360 is a button, switch, or the like that receives operation input from a user. The operation section 360 may be implemented by a hardware input device such as a switch or a keyboard, or by a touch panel or the like formed integrally with the display 350. A touch panel input can be detected by any common detection method using, for example, a resistive film, infrared light, electromagnetic induction, or electrostatic capacity.

The communication section 370 communicates with other devices via a network. For example, the network communication section 370 should have an interface that can connect to a network and can communicate with other devices via a wired/wireless local area network (LAN). The communication section 370 also supports Bluetooth (registered trademark) to communicate with other Bluetooth-enabled devices.

Processing by Terminal Device Including Material Distribution Instruction

Figure 6:
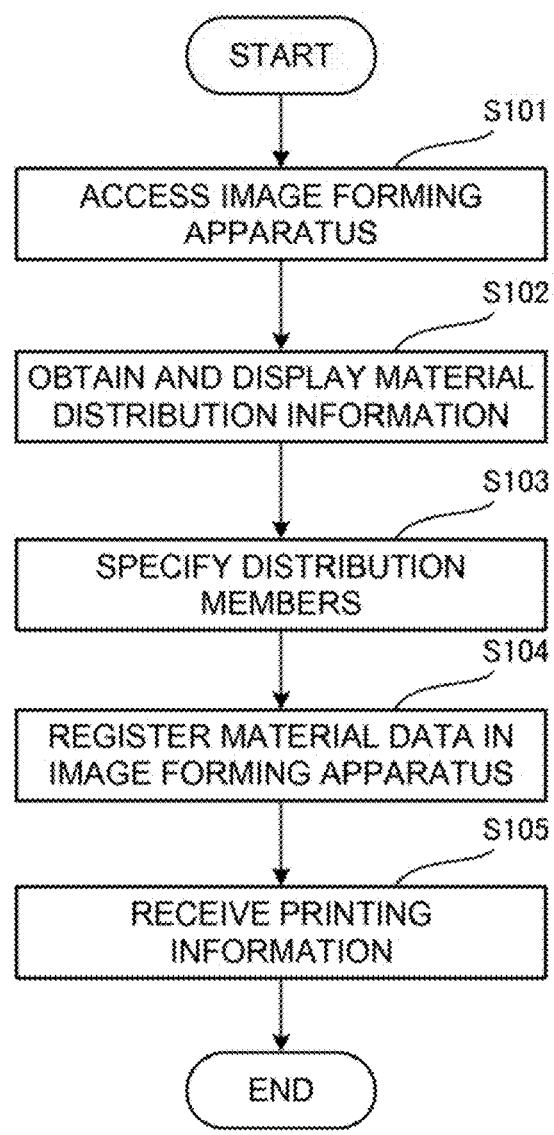
FIG. 6 is a flowchart of distribution instruction processing by the terminal device according to the first embodiment.

The member A uses the terminal device 30a to give instructions for distributing meeting materials and printing the distributing materials with the image forming apparatus 10. It is assumed herein that, the members A to I respectively use the terminal devices 30a to 30i, as described in connection with FIG. 1. FIG. 6 is a flowchart of distribution instruction processing by a terminal device according to the first embodiment.

First, the member A accesses the image forming apparatus 10 with the terminal device 30a (step S101). Then, the terminal device 30a obtains the material distribution information 121 and displays it on the display 350 (step S102). The user (member A) specifies distribution members (step S103), sends the material data 122 to the image forming apparatus 10, and stores and registers the material data 122 in the storage 120 (step S104). Here, the distribution target is all the members A to I listed in the material distribution information 121 in FIG. 5.

Alternatively, the distribution members may be specified from among the members A to I. The material distribution information may include multiple pieces of information, for example, for each meeting or project from which the user may make selection therefrom.

At the time of specifying the distribution members with the terminal device 30 in step S103, it is possible to specify printing date and time and time until the printing processing is executed (time for processing the printing change notice in step S211, which will be described later) as a predetermined time. The predetermined time may be set to any time by default, if not specified.

The image forming apparatus 10 generates printing information including the members who need printing, the number of copies to be printed, and the material data according to the specified distribution members, and sends the printing information to the terminal device 30a. The terminal device 30a receives the printing information (step S105).

When the user A specifies the printing date and time to the image forming apparatus 10, the image forming apparatus 10 transmits the distribution members who need printing that have been changed by the specified printing date and time and the number of copies to be printed to the terminal device 30a, and prints the required number of copies on the specified printing date and time.

Processing by Image Forming Apparatus

Figure 7:
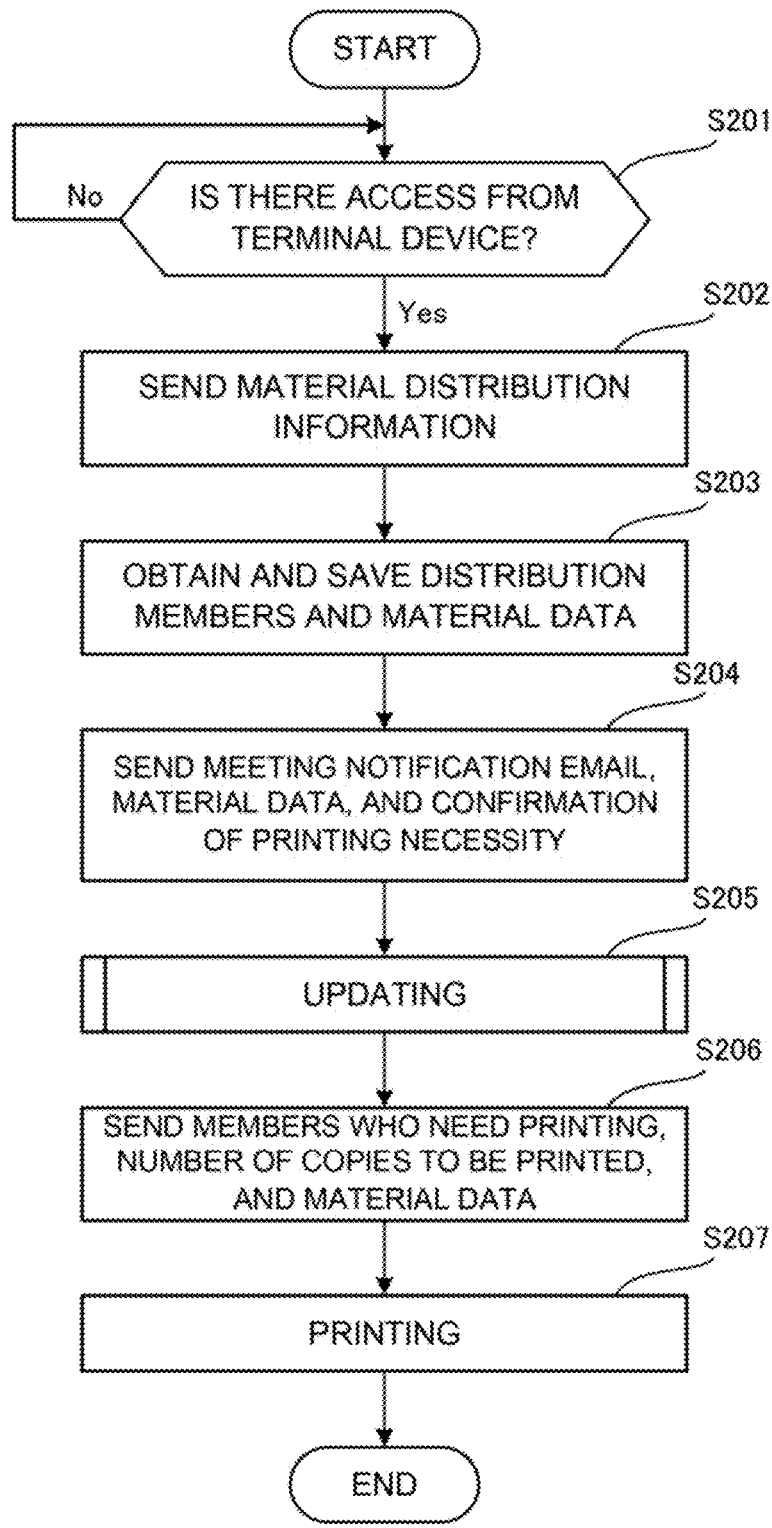
FIG. 7 is a flowchart of the distribution processing of the image forming apparatus according to the first embodiment.

FIG. 7 is a flowchart of the distribution processing of the image forming apparatus according to the first embodiment.

The image forming apparatus 10 determines whether there is an access from the terminal device 30 (step S201), and if there is an access, transmits the material distribution information 121 saved in the storage 120 to the terminal device 30 (step S202). Here, it is assumed that the access is made from the terminal device 30a. The image forming apparatus 10 obtains the distribution members (here, the members A to I) and the material data from the terminal device 30a, extracts information about the distribution members from the material distribution information 121, and stores the material data 122 in the storage 120 (step S203).

At this time, if predetermined time is specified by the terminal device 30, the storage 120 also stores the predetermined time.

The data sending processor 112 of the distribution processing section 102 in the controller 100 of the image forming apparatus 10 sends a meeting notification email to the email addresses of the distribution members via the communication section 170, while sending the material data 122 to the data sending addresses of the material distribution information 121 (step S204). The email to be sent includes a confirmation notice of the printing necessity and the processing details of the notice in a case of changing the "printing necessity" part of the material distribution information 121. The email may also include the predetermined time stored in the storage 120.

The next step is to update the material distribution information 121 (step S205), which will be described in detail later, and to transmit the printing information necessary for the printing to the terminal device 30a (step S206). The printing information includes the members who need printing and the number of copies to be printed.

The image forming processor 101 in the controller 100 of the image forming apparatus 10 executes printing processing for the number of copies to be printed of the material data according to the printing information (step S207).

Figure 8:
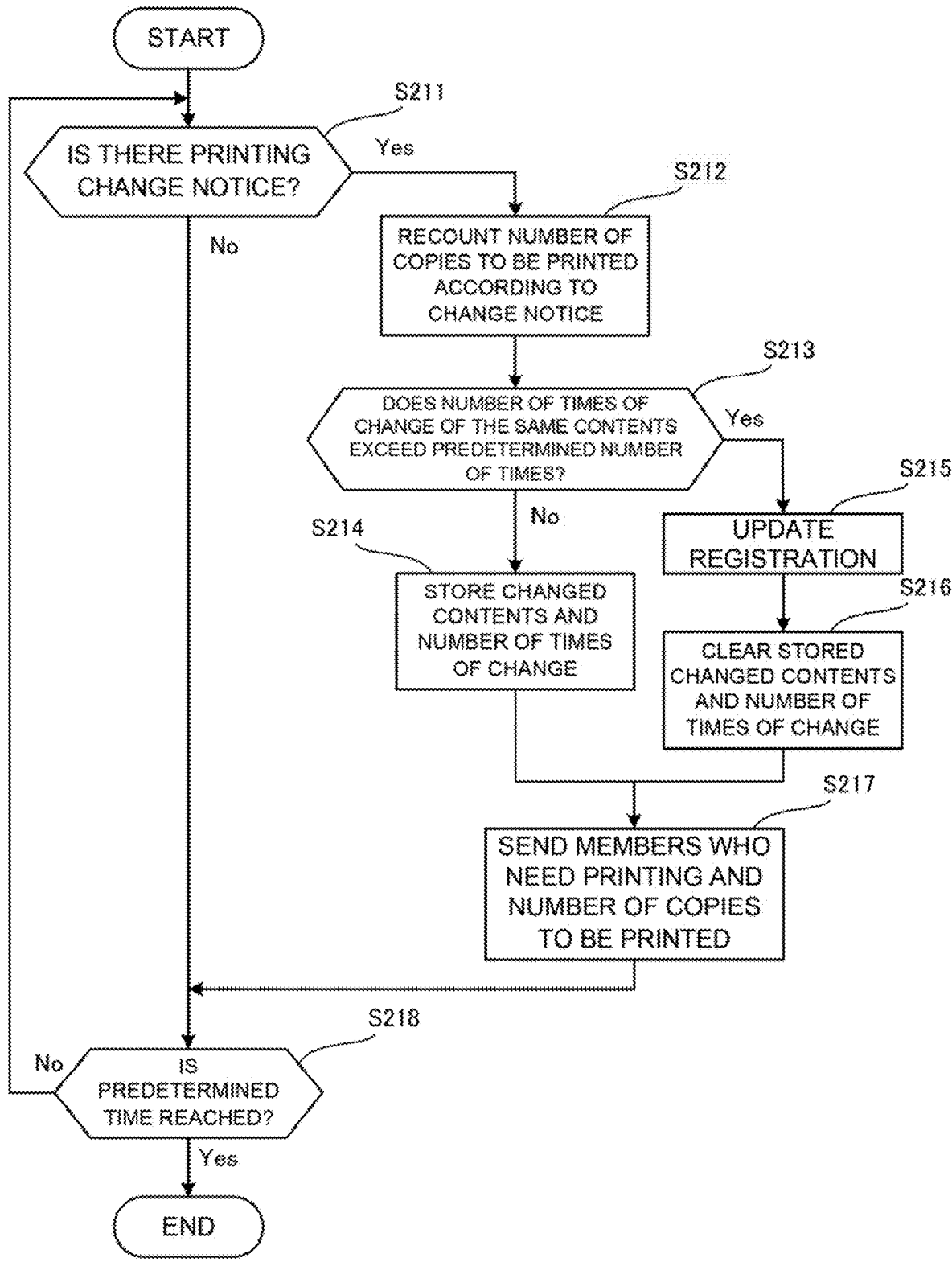
FIG. 8 is a flowchart of update processing of material distribution information of the image forming apparatus according to the first embodiment.

Next, the update processing of the material distribution information 121 in step S205 is described. FIG. 8 is a flowchart of the update processing of the material distribution information of the image forming apparatus according to the first embodiment.

The update section 114 in the distribution processing section 102 of the image forming apparatus 10 checks whether there is a notice of change of the printing necessity from any of the distribution target members (step S211). If there is no notice of change of the printing necessity (step S211; No), the update section 114 checks whether the predetermined time mentioned in step S103 has been reached (step S218). If the predetermined time has not been reached, the process returns to step S211. If the predetermined time has been reached, the process ends. If there is the notice of change of the printing necessity (step S211; Yes), the update section 114 causes the counter 111 to redo counting of the number of copies to be printed according to the changed contents (step S212).

The update section 114 checks whether the number of times of the same change made by the same member has exceeded a predetermined number of times according to the number of times of change of printing necessity 123 in the storage 120 (step S213). If the number of times of the change has not exceeded a predetermined number of times, the update section 114 stores the changed contents and the number of times of change in the storage 120 (step S214). If the predetermined number of times is exceeded, the update section 114 updates the registered contents of the material distribution information 121 to the changed contents (step S215). Then, the changed contents and the number of times of change that has been saved in the storage 120 are cleared (step S216). The update section 114 sends the changed members who need printing and the number of copies to be printed to the terminal device 30a by email (step S217).

Thus, it is not necessary to survey the members who need printing and set the number of copies to be printed each time the materials for meetings and the like are distributed. Since the members who need printing and the number of copies to be printed can be determined simply by specifying the members who need printing, no omission occurs in the number of copies to be printed, thus improving operational efficiency.

Further, the material distribution information is automatically updated according to the number of times of change. This eliminates the need to update the information every time, thus saving time and improving operational efficiency.

Although the image forming apparatus 10 performs the printing processing only for the members who need printing among the members of the distribution target, the printing processing may be performed differently. Specifically, a server having the functions of the distribution processing section 102 and the storage 120 in the controller 100 of the image forming apparatus 10 may operate as the distribution processor. In this case, the server distributes the material data via a network in accordance with the material distribution information and sends the printing information to the image forming apparatus to initiate printing.

Second Embodiment

A material distribution processing system according to a second embodiment determines, for example, whether to send the materials as electronic data or print them depending on the number of pages of the materials.

Functional Configuration of Each Device

The configuration of the device is the same as that of the first embodiment, and the description thereof is not repeated.

Processing by Terminal Device Including Material Distribution Instruction Device The processing performed by the terminal device is also the same as the processing of the first embodiment illustrated in FIG. 6, and the description thereof is not repeated.

Processing by Image Forming Apparatus

Figure 9:
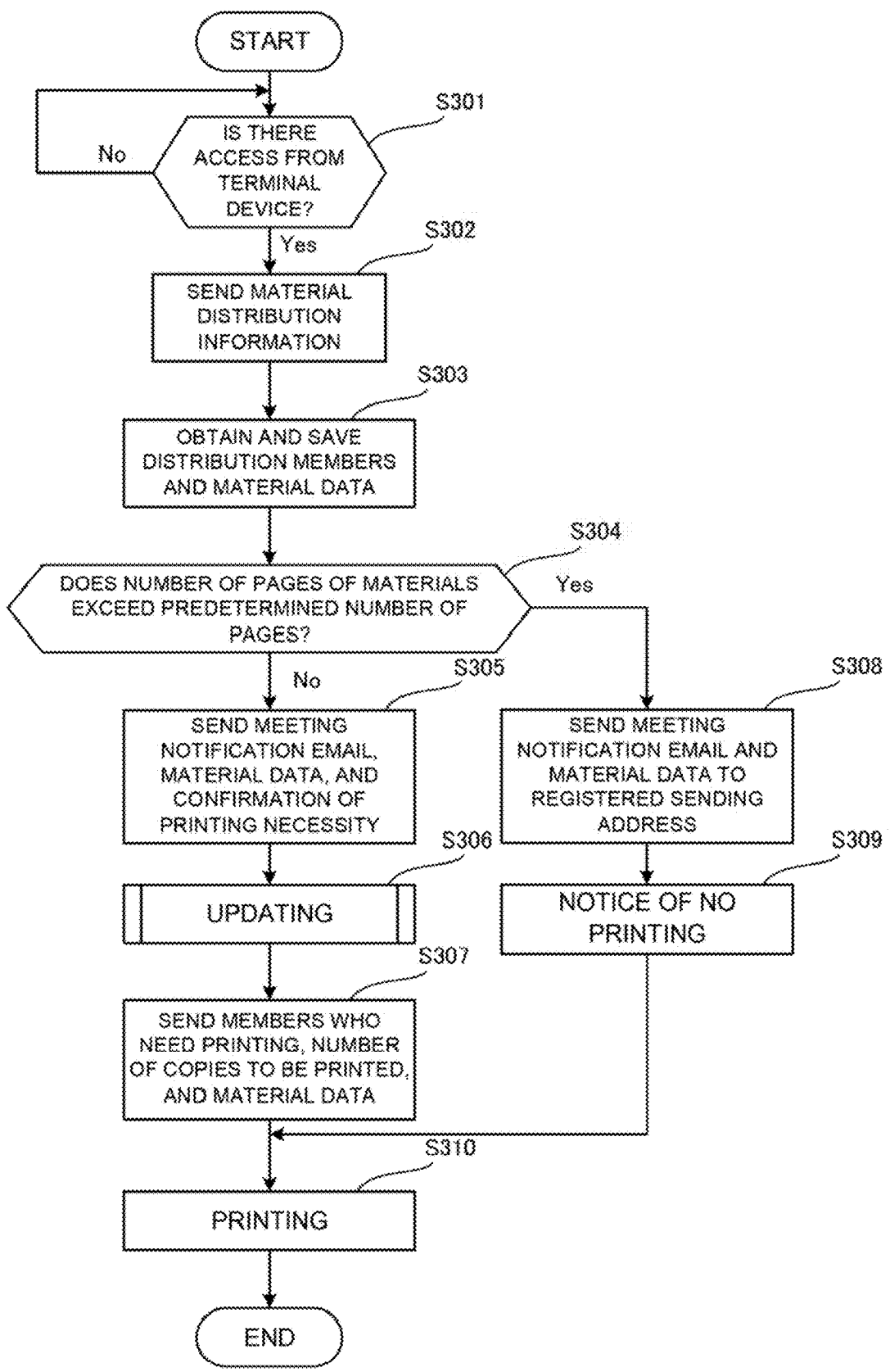
FIG. 9 is a flowchart of the distribution processing of the image forming apparatus according to a second embodiment.

FIG. 9 is a flowchart of distribution processing of the image forming apparatus according to a second embodiment.

The image forming apparatus 10 determines whether there is an access from the terminal device 30 (step S301), and if there is an access, transmits the material distribution information 121 saved in the storage 120 to the terminal device 30 (step S302). Here, it is assumed that the access is made from the terminal device 30a. The image forming apparatus 10 obtains the distribution members (here, the members A to I) and distributing the material data from the terminal device 30a, extracts the information on the distribution members from the material distribution information, and save the material data 122 in the storage 120 (step S303).

The counter 111 of the distribution processing section 102 in the controller 100 of the image forming apparatus 10 counts the number of pages of the material data and determines whether the number of pages of the material exceeds a predetermined number of pages (step S304). The predetermined number of pages is set to, for example, 100 pages.

If the number of pages of the material data does not exceed the predetermined number of pages, the system proceeds to step S305. Steps S305 to S307 and S310 are the same process steps as steps S204 to S207 of FIG. 7, and the description thereof is not repeated.

If the number of pages of the material data exceeds the predetermined number of pages, the process proceeds to step S308 where the data sending processor 112 sends the material data and the meeting notification email to the registered sending addresses. The terminal device 30a is notified of no printing (printing information: the number of copies to be printed is zero), while no printing notice is also sent to the terminal devices 30b to 30i of the other participants of the meeting (step S309).

In this way, when the number of pages of the material data exceeds the predetermined number and the number of pages to be printed becomes very large, there is no need to perform such a large volume of printing processing and only the distribution of the material data is performed, thus reducing waste of resources and costs, saving time and effort, and improving operational efficiency.

Third Embodiment

A material distribution processing system according to a third embodiment determines on, for example, whether to send the material as electronic data or print depending on the number of members of the meeting.

Functional Configuration of Each Device

The configuration of the device is the same as that of the first embodiment, and the description thereof is not repeated.

Processing by Terminal Device Including Material Distribution Instruction Device The processing performed by the terminal device is also the same as the processing of the first embodiment illustrated in FIG. 6, and the description thereof is not repeated.

Processing by Image Forming Apparatus

Figure 10:
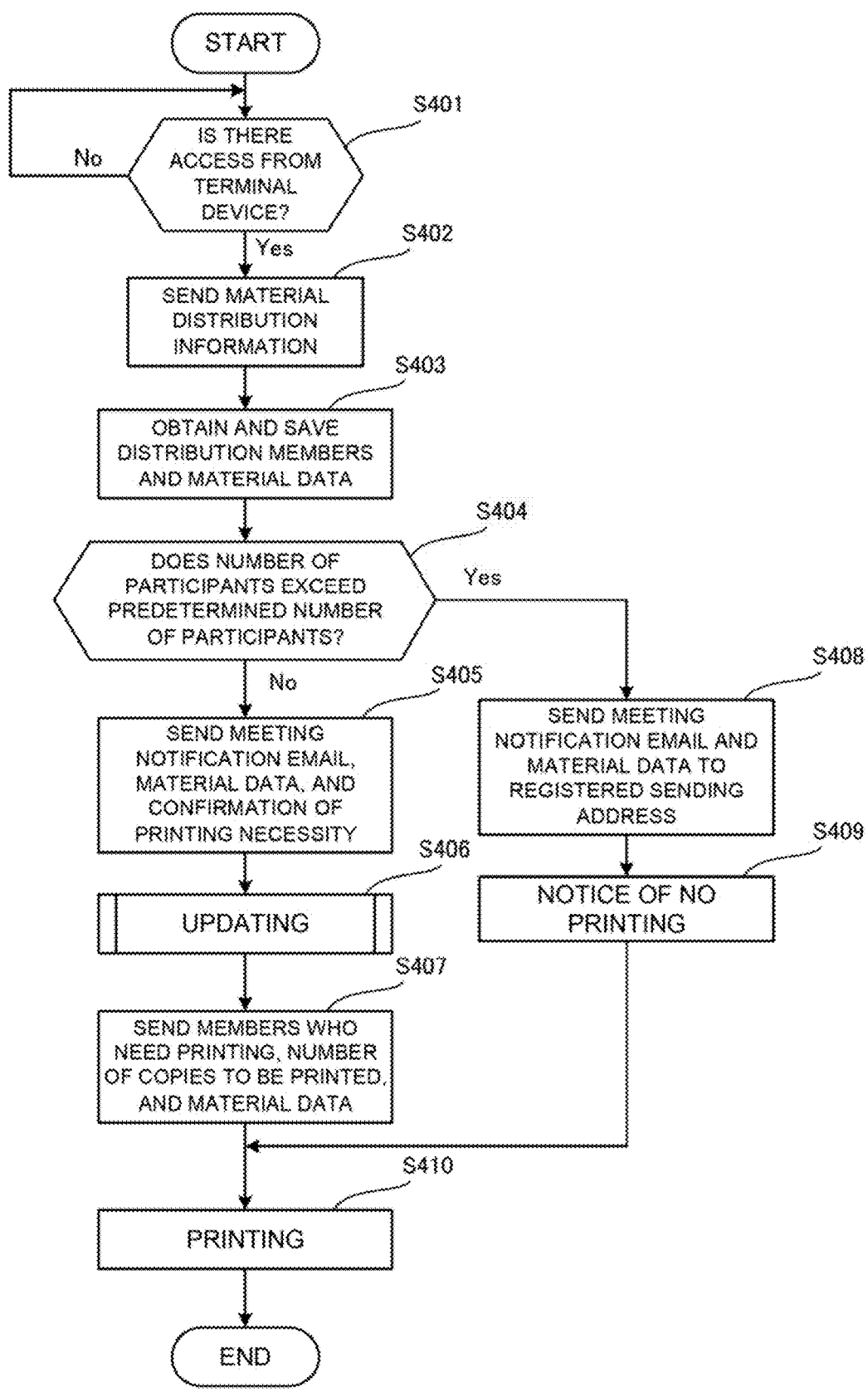
FIG. 10 is flowchart of the distribution processing of the image forming apparatus according to a third embodiment.

FIG. 10 is a flowchart of the distribution processing of the image forming apparatus according to the third embodiment.

The image forming apparatus 10 determines whether there is an access from the terminal device 30 (step S401) and, if there is an access, transmits the material distribution information 121 saved in the storage 120 to the terminal device 30 (step S402). Here, it is assumed that the access is made from the terminal device 30a. The image forming apparatus 10 obtains the distribution members (here, the members A to I) and distributing the material data from the terminal device 30a, extracts the information on the distribution members from the material distribution information, and save the material data 122 in the storage 120 (step S403).

The counter 111 of the distribution processing section 102 in the controller 100 of the image forming apparatus 10 counts the number of participants of the meeting and determines whether the number of the participants exceeds a predetermined number of participants (step S404). The predetermined number of participants is set to, for example, 50 participants.

If the number of the participants does not exceed the predetermined number of participants, the process proceeds to step S405. Steps S405 to S407 and 410 are the same process steps as steps S204 to S207 of FIG. 7, and the description thereof is not repeated.

If the number of participants exceeds the predetermined number of participants, the process proceeds to step S408 and sends the material data with the meeting notification email to the registered sending addresses. The terminal device 30a is notified of no printing (printing information: the number of copies to be printed is zero), while no printing notice is also sent to the terminal devices 30b to 30i of the other participants of the meeting (step S409).

In this way, when the number of participants of the meeting exceeds the predetermined number of participants, there is no need to perform the printing processing, thus reducing waste of resources and costs, saving time and effort, and improving operational efficiency.

Fourth Embodiment

A material distribution processing system according to a fourth embodiment determines, for example, whether to send the materials as electronic data or print them depending on the department of each member.

Functional Configuration of Each Device

The configuration of the device is the same as that of the first embodiment, and the description thereof is not repeated.

Processing by Terminal Device Including Material Distribution Instruction Device The processing performed by the terminal device is also the same as the processing of the first embodiment illustrated in FIG. 6, and the description thereof is not repeated.

Processing by Image Forming Apparatus

Figure 11:
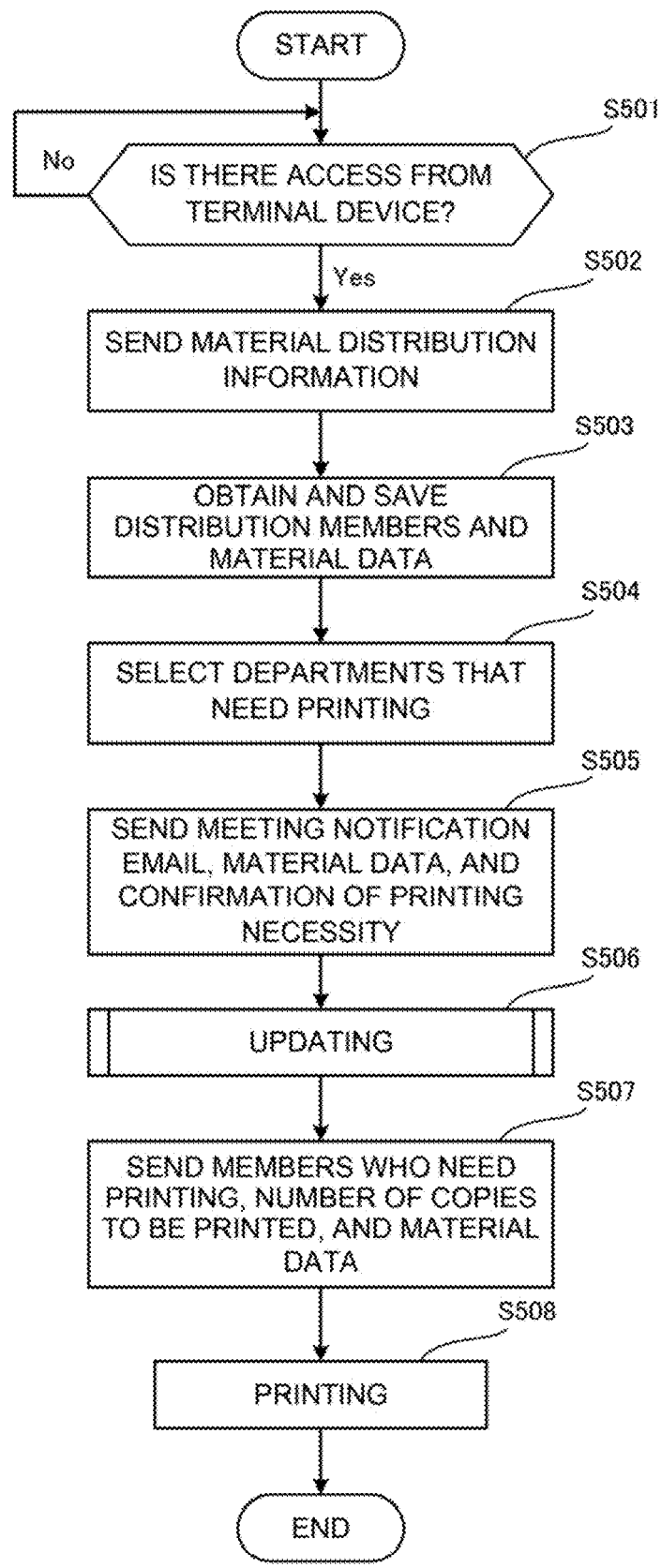
FIG. 11 is a flowchart of the distribution processing of the image forming apparatus according to a fourth embodiment.

FIG. 11 is a flowchart of the distribution processing of the image forming apparatus according to the fourth embodiment.

The image forming apparatus 10 determines whether there is an access from the terminal device 30 (step S501) and, if there is an access, transmits the material distribution information 121 saved in the storage 120 to the terminal device 30 (step S502). Here, it is assumed that the access is made from the terminal device 30a. The image forming apparatus 10 obtains the distribution members (here, the members A to I) and distributing the material data from the terminal device 30a, extracts the information on the distribution members from the material distribution information, and save the material data 122 in the storage 120 (step S503).

The data sending processor 112 of the distribution processing section 102 in the controller 100 of the image forming apparatus 10 sends the meeting notification email to the email addresses of the distribution members via the communication section 170, and also sends the material data 122 to the data sending addresses of the material distribution information 121 (step S504). The email to be sent includes a confirmation notice of the printing necessity and the processing details of the notice in a case of changing the "printing necessity" part of the material distribution information 121.

Next, the image forming apparatus 10 selects at least a department that needs printing (step S505). For example, the printing target is only the members of the department located in the same building as the department of the member A to whom the distribution is specified. The member A belongs to the department Y, and if the departments W and Y are located in the same building, both departments are selected as the printing target, because the member A is in the department W. The department Z is located in a remote area, and the members there are likely to participate remotely, so that only data distribution is available. Alternatively, the members of the same department can be the printing target, and the other departments are set to the data sending only. Alternatively, the members who do not show up for work (due to business trips, vacations, telework, etc.) can be the target of data sending, instead of printing, in conjunction with attendance management.

The meeting notification email is sent to the email addresses of the distribution members via the communication section 170, and the material data 122 is sent to the data sending addresses of the material distribution information 121 (step S505). Then, the material distribution information 121 is subject to updating processing (step S506), and the printing information necessary for printing is sent to the terminal device 30a (step S507).

The image forming processor 101 in the controller 100 of the image forming apparatus 10 executes printing for the number of printed copies of the material data according to the printing information (step S508).

The update processing in step S506 is the same as the update processing in step 205 of FIG. 7 (the processing details of FIG. 8), and the description thereof is not repeated.

In this way, the printing target departments necessary for printing are selected according to the department of the user who gave the distribution instruction, and printing and distribution is executed for the members of the department, thus eliminating unnecessary printing, achieving the effect of reducing waste of resources and costs, saving time and effort, and improving operational efficiency.

Modification

In the above embodiments according to the present disclosure, the distribution processing section is incorporated in the image forming apparatus to execute processing. Alternatively, a server connected to the network may function as the distribution processing section. In such a server-based distribution processing section, the controller performs the same function as that of the distribution processor in the controller 100 of the image forming apparatus 10, and the storage and the communication section respectively perform the same functions as those of the storage 120 and the communication section 170 of the image forming apparatus 10.

In the distribution processor according to the present disclosure, a program that controls the CPU and the like (a program that enables the functions of the computer) may run to implement the functions recited in the above embodiments of the present disclosure. The information handled by the above devices is temporarily stored in a random access memory (RAM) at the time of processing, stored in various read-only memories (ROMs) such as a flash ROM or an HDD, and then read, corrected and written as necessary by the CPU. Alternatively, a program that implements the functions of the individual configurations may be recorded on a computer-readable recording medium, and such a program recorded on the recording medium may be read into the computer system and executed to process respective parts. The term "computer system" as used herein includes hardware such as the operating system and peripheral devices.

The "computer-readable recording medium" refers to a portable medium such as a flexible disk, an optical magnetic disk, a ROM, a CD-ROM, or the like, or a storage device such as a built-in hard disk in a computer system. The program mentioned above may implement some of the above-described functions, and may implement the functions in combination with any program that has already been recorded in the computer system.

The embodiments described above have been presented by way of example only, and the technical scope of the present invention as recited in the appended claims is not limited by these embodiments.

What is claimed is:

1. A distribution processor that performs processing related to material distribution, comprising:
   a storage that stores material data and material distribution information including a sending address and printing necessity of the material data for each of a plurality of distribution members;
   a counter that performs counting in accordance with the material distribution information or the material data;
   a data sending processor that sends the material data to the sending address of each of the distribution members for the material data in accordance with the material distribution information and a counting result of the counter; and
   a printing information generating section that generates printing information for printing the material data, wherein
   the counter counts a number of copies to be printed of the material data that is distributed depending on the printing necessity of the material distribution information, and
   the printing information generating section generates the printing information including the distribution members and the number of copies to be printed counted by the counter.

2. The distribution processor according to claim 1, further comprising:
   an update section that causes the counter to perform counting by changing the printing necessity without changing other contents of the material distribution information, causes the storage to save a number of times of change of the printing necessity, and updates the printing necessity of the material distribution information according to the changed contents when the number of times of change of the printing necessity reaches a predetermined number of times or more.

3. The distribution processor according to claim 1, wherein
   the counter counts a number of pages of the material data, and
   when the number of pages of the material data is equal to or greater than a predetermined number of pages, the printing information generating section sets the number of copies to be printed to zero.

4. The distribution processor according to claim 1, wherein
   the counter counts a number of the distribution members, and
   when the number of the distribution members is equal to or greater than a predetermined number of members, the printing information generating section sets the number of copies to be printed to zero.

5. The distribution processor according to claim 1, wherein
   the material distribution information includes information on a department to which each of the distribution members belongs, and
   the counter selects a department that needs printing and performs counting on distribution members who belong the selected department.

6. An image forming apparatus comprising the distribution processor according to claim 1, wherein
   the image forming apparatus sends data and prints the material data in accordance with the printing information.

7. A distribution processing method that performs processing related to material distribution, comprising:
   storing material data and material distribution information including a sending address and printing necessity of the material data for each of a plurality of distribution members;
   counting in accordance with the material distribution information or the material data;
   sending the material data to the sending address of each of the distribution members for the material data in accordance with the material distribution information and a counting result in the counting; and
   generating printing information for printing the material data, wherein
   the counting counts a number of copies to be printed of the material data that is distributed depending on the printing necessity of the material distribution information, and
   the generating the printing information generates the printing information including the distribution members and the number of copies to be printed counted in the counting.

* * * * *